(12) United States Patent
Siuchta et al.

(10) Patent No.: US 10,046,814 B2
(45) Date of Patent: Aug. 14, 2018

(54) CONTROLLING WEIGHT ALLOCATION BETWEEN TRUCK AXLES

(71) Applicant: International Truck Intellectual Property Company, LLC, Lisle, IL (US)

(72) Inventors: Grzegorz Siuchta, Des Plaines, IL (US); James Jerome Korson, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 169 days.

(21) Appl. No.: 15/042,910

(22) Filed: Feb. 12, 2016

(65) Prior Publication Data

US 2016/0257355 A1    Sep. 8, 2016

Related U.S. Application Data

(60) Provisional application No. 62/127,652, filed on Mar. 3, 2015.

(51) Int. Cl.
*B62D 53/06* (2006.01)
*B60W 40/13* (2012.01)
*B62D 61/12* (2006.01)

(52) U.S. Cl.
CPC .......... *B62D 53/068* (2013.01); *B60W 40/13* (2013.01); *B60W 2040/1307* (2013.01); *B62D 61/12* (2013.01); *B62D 61/125* (2013.01)

(58) Field of Classification Search
CPC .. B60G 17/0528; B60G 61/12; B62D 61/125; B62D 61/12; B60W 2040/1307; B60W 40/13
See application file for complete search history.

(56) References Cited

U.S. PATENT DOCUMENTS

| | | | | |
|---|---|---|---|---|
| 4,993,729 | A | * 2/1991 | Payne | B60G 17/0523 180/24.02 |
| 5,052,713 | A | * 10/1991 | Corey | B60G 17/0155 280/5.5 |
| 5,167,289 | A | * 12/1992 | Stevenson | G01G 5/04 177/141 |
| 7,140,461 | B2 | * 11/2006 | Morrow | B60K 6/365 180/65.245 |
| 2002/0074746 | A1 | * 6/2002 | Eberling | B60G 17/0155 280/5.5 |
| 2006/0170168 | A1 | * 8/2006 | Rotz | B60G 17/0155 280/5.501 |
| 2015/0034399 | A1 | * 2/2015 | Clayton | B62D 61/12 180/24.02 |
| 2015/0197133 | A1 | * 7/2015 | VanRaaphorst | B60G 17/052 280/6.159 |
| 2016/0257355 | A1 | * 9/2016 | Siuchta | B62D 53/068 |
| 2016/0332498 | A1 | * 11/2016 | Lindsay | B60T 13/662 |

* cited by examiner

*Primary Examiner* — Karen Beck
(74) *Attorney, Agent, or Firm* — Jeffrey P. Calfa; Mark C. Bach (57) ABSTRACT

In a truck vehicle, a controller controls a mechanism to apportion the sum total of weight borne by a tandem axle between a drive axle and a tag axle.

16 Claims, 8 Drawing Sheets

FIG. 11

CONTROLLING WEIGHT ALLOCATION BETWEEN TRUCK AXLES

REFERENCE TO RELATED APPLICATION AND PRIORITY CLAIM

This application claims priority of Provisional Patent Application No. 62/135,487 filed on 19 Mar. 2015, the entire content of which is incorporated herein by reference.

TECHNICAL FIELD

The present disclosure relates to a truck vehicle which has a 6×2 configuration, such configuration being known in the United States trucking industry. In particular, the disclosed subject matter relates to a system and method for controlling the allocation of weight borne by fore and aft axles of a tandem axle of a truck vehicle, one of the two axles being a drive axle and the other being a non-drive axle, commonly called a tag axle.

BACKGROUND

A truck vehicle having a 6×2 configuration comprises right and left front steering wheels and a tandem rear axle which has a fore axle and an aft axle one of which is a drive axle and the other of which is a non-drive axle. Typically, the fore axle is the drive axle and the aft axle is the tag axle.

It is generally recognized within the trucking industry that a truck vehicle having a 6×4 configuration (both axles of a tandem rear axle being drive axles) provides better road traction than a truck vehicle having a 6×2 configuration. However, because a truck vehicle having a 6×2 configuration is lighter in weight, it can transport a heavier payload, and it can operate with better fuel economy not only because of its lighter weight, but also because its simpler powertrain has smaller energy losses. It is also generally recognized that a truck vehicle having a 6×2 configuration may be prone to uneven tire wear between tires on the drive axle and those on the tag axle. For mitigating issues involving fuel economy and tire wear, some truck vehicles which have a 6×2 configuration also have a mechanism which can be manually set while the vehicle is stopped to re-distribute weight borne by one of the tandem rear axles to the other.

SUMMARY OF THE DISCLOSURE

The present disclosure relates to a truck vehicle having a system and method for allocation of weight to drive and tag axles which allows weight allocation to each axle to be changed without having to stop the truck vehicle. Weight allocation can be changed automatically as a function of one or more variables such as travelling speed, geographic location of a truck vehicle, and on-road/off-road surface condition.

This capability can mitigate uneven tire wear and can improve tire traction during on- and off-road travel where conditions which adversely affect tire traction on an underlying road surface or bare ground may be present. Traction can be improved both longitudinally and laterally.

Travelling speeds at which axle weight allocations are changed can be fixed in an on-board control module or can be varied either on-board the truck vehicle by a driver or remotely via wireless communication.

A general aspect of the present disclosure relates to a truck vehicle comprising a chassis having a chassis frame, steerable right and left front wheels suspended from the chassis frame, and a tandem axle comprising a drive axle and a tag axle suspended from the chassis frame rearward of the front wheels.

A controller controls a mechanism to apportion the sum total of weight borne by the tandem axle between the drive axle and the tag axle. The controller may also control weight apportionment in conjunction with control of ride height of the tandem axle.

DETAILED DESCRIPTION

Figure 1:
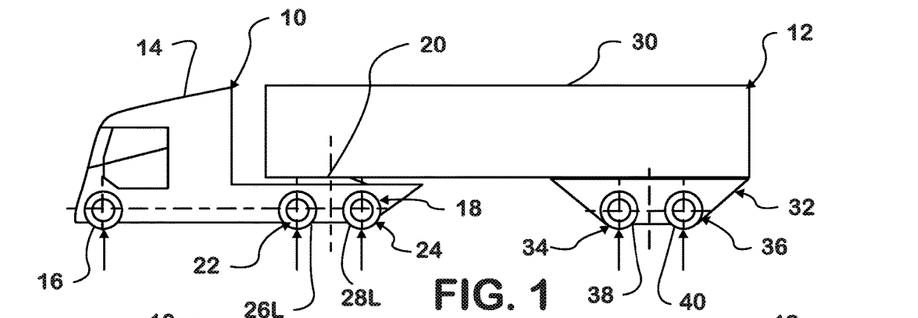
FIG. 1 schematically presents a left side elevation view of a 6×2 truck vehicle to which a trailer is coupled for towing by the truck vehicle.

FIG. 1 shows a 6×2 truck vehicle 10 to which a trailer 12 is coupled for towing. Truck vehicle 10 has a chassis comprising a chassis frame on which is mounted a cab 14 having an interior compartment for a driver. Steerable front wheels 16 are suspended from the chassis frame on right and left sides of truck vehicle 10 for bearing some of the truck vehicle's weight. A tandem axle 18 is also suspended from the chassis frame for bearing both the remainder of the truck vehicle's weight and a portion of the weight of trailer 12 which is imposed on truck vehicle 10 via a fifth wheel 20 which is mounted on the truck vehicle's chassis frame over tandem axle 18 and to which trailer 12 is coupled by a kingpin on trailer 12. Weight is a measure of load borne by tandem axle 18.

Tandem axle 18 comprises a fore axle 22 and an aft axle 24. Right and left dual wheels 26R, 26L (see FIG. 5 also) are at opposite ends of axle 22, and right and left dual wheels 28R, 28L are at opposite ends of axle 24.

Trailer 12 has a chassis frame on which is mounted a cargo-carrying body 30. A rear wheel bogey 32 bears the portion of the trailer's weight not borne by truck vehicle 10. The illustrated example of rear wheel bogey 32 is a tandem axle bogey suspended from the trailer's chassis frame and having a non-driven fore axle 34 and a non-driven aft axle 36. Right and left dual wheels 38 are at opposite ends of axle 34, and right and left dual wheels 40 are at opposite ends of axle 36.

Figure 5:
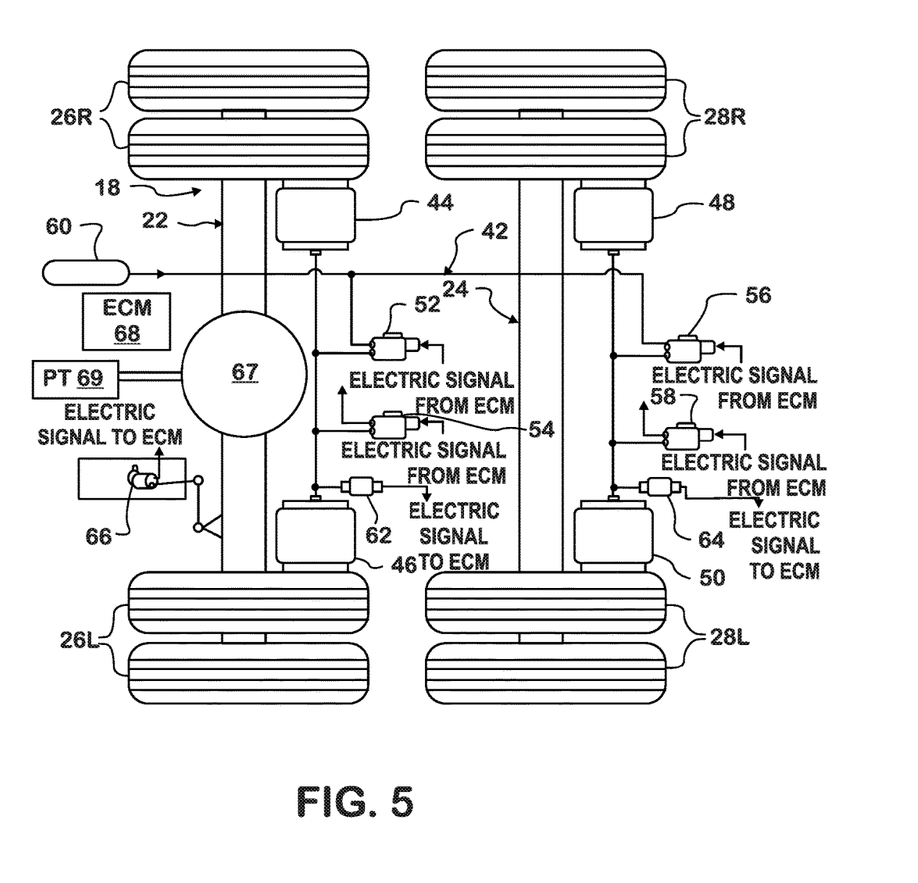
FIG. 5 is a schematic portrayal of a tandem axle of the truck vehicle including a ride height adjustment mechanism.

FIG. 5 shows tandem axle 18 and a mechanism 42 for apportioning the sum total of weight borne by tandem axle 18 between axle 22 and axle 24. Mechanism 42 is controlled by a control system which operates to apportion a desired percentage of the sum total of weight borne by tandem axle 18 to one of its axles while forcing ride height of the tandem axle to conform to a desired ride height. While a gas bag mechanism will be described as an example of mechanism 42, other mechanisms can be used with the disclosed control strategy.

Ride height is commonly understood to mean vertical distance of the chassis frame above an underlying road surface with which wheels 26R, 26L, 28R, and 28L are in contact, as measured at one of the two axles if truck vehicle 10 were stopped. In some vehicles ride height can be set to a desired ride height within a range of possible ride heights. When truck vehicle 10 is travelling, actual ride height can fluctuate from a desired setting for various reasons, such as irregularity of an underlying road surface.

Mechanism 42 comprises four gas bags 44, 46, 48, 50, each of which is associated with a respective suspension of axles 22, 24 at a respective one of each axle's wheels. In other words, gas bag 44 is associated with a suspension which is proximate right dual wheels 26R of axle 22, gas bag 46 is associated with a suspension which is proximate left dual wheels 26L of axle 22, gas bag 48 is associated with a suspension which is proximate right dual wheels 28R of axle 24, and gas bag 50 is associated with a suspension which is proximate left dual wheels 28L of axle 24.

Each gas bag contains a gas, typically air, and can expand and contract in length as a function of gas pressure inside the bag. When gas bags of an axle extend in length, they move the chassis frame vertically upward relative to the axles' wheels. When gas bags of an axle contract in length, the chassis frame moves vertically downward relative to the axles' wheels.

The two gas bags associated with each axle 22, 24 are arranged to set a distance of the chassis frame to an underlying road surface which is substantially uniform along the respective axle's length. However, that distance may not necessarily be the same at each axle.

Mechanism 42 further comprises four electric-operated control valves 52, 54, 56, and 58. Control valves 52, 54 are associated with gas bags 44, 46, and control valves 56, 58 are associated with gas bags 48, 50. Control valves 52, 56 are referred to as supply valves because when operated, they enable the associated gas bags to be supplied with more gas, and control valves 54, 58 are referred to as dump valves because they operate to dump (i.e. vent) some gas from the associated gas bags.

All four control valves are normally closed. When a supply valve 52, 56 is operated, it opens so that compressed gas from a source such as a compressed air tank 60 can pass through the valve and into the gas bags associated with the respective axle. When a dump valve 54, 58 is operated open, compressed gas from the gas bags associated with the respective axle is vented through the dump valve.

A respective pressure sensor 62, 64 provides an electric signal output which is a measure of gas pressure in the gas bags of the respective axle 22, 24.

A ride height sensor 66 provides an electric signal output which is a measure of ride height of tandem axle 18. In this example, sensor 66 measures ride height at axle 22 which is also the drive axle of the 6×2 configuration, leaving axle 24 as the non-drive, or tag, axle. Axle 22 has a differential 67 to an input of which a powertrain 69 of truck vehicle 10 is coupled for propelling truck vehicle 10.

Control of gas pressure in gas bags 22, 24 and of gas pressure in gas bags 26, 28 is performed via an electronic control module (ECM) 68 of the control system for mechanism 42. The electric signal outputs of pressure sensors 62, 64 and of ride height sensor 66 are signal inputs to ECM 68. ECM 68 provides respective signal outputs which control supply valve 52, dump valve 54, supply valve 56, and dump valve 58.

The sum total of the portion of the weight of truck vehicle 10 imposed on tandem axle 18 and the portion of the weight of trailer 12 imposed on fifth wheel 20 is apportioned between axles 22, 24. That sum total can be apportioned in different percentages by controlling gas pressure in the gas bags associated with one or both of the two axles 22, 24.

FIGS. 6, 7, 8, and 9 are diagrams which disclose a control strategy 70 for apportioning that sum total between axles 22, 24.

Figure 6:
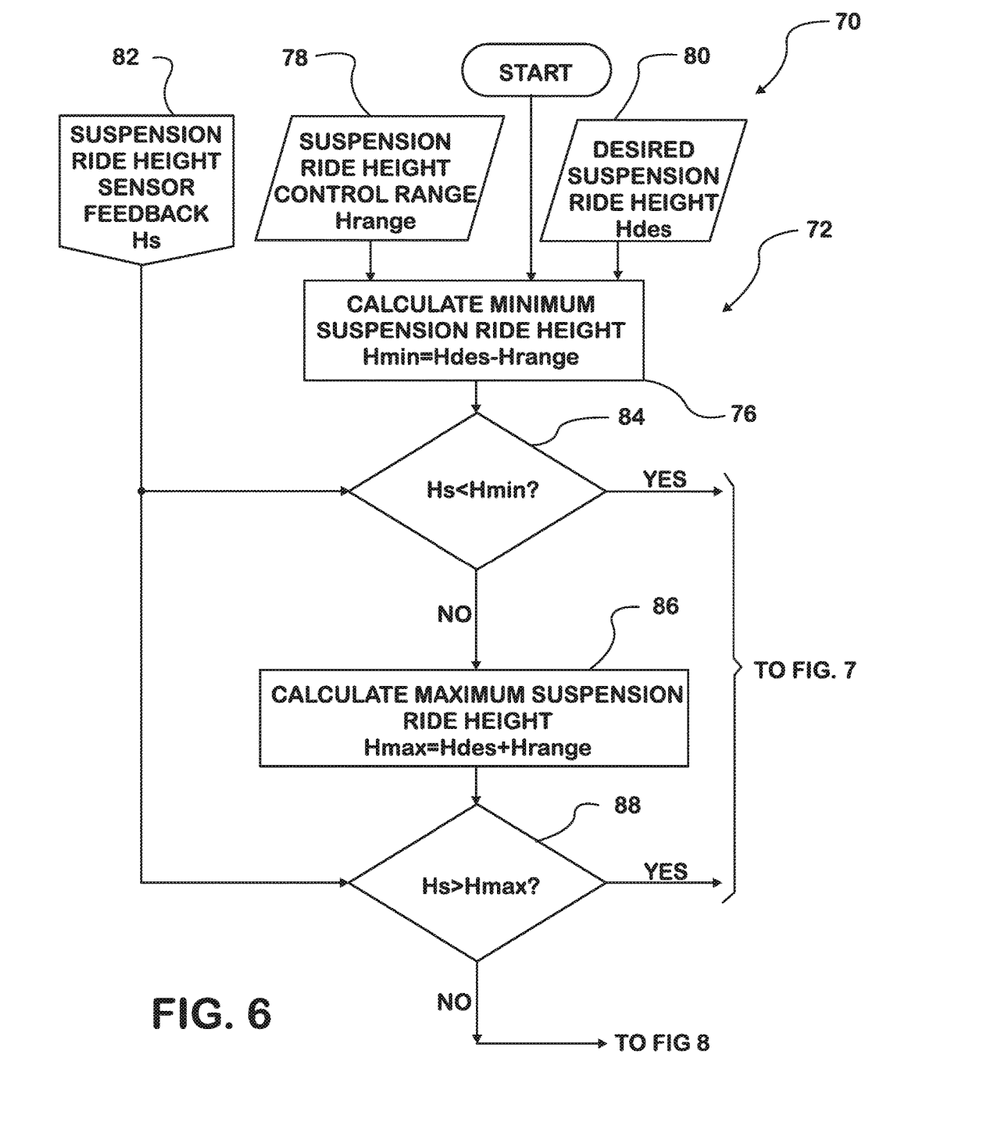
FIGS. 6-9 comprise low level strategy diagrams of a control strategy for allocating weight borne by fore and aft axles of the tandem axle.
Figure 7:
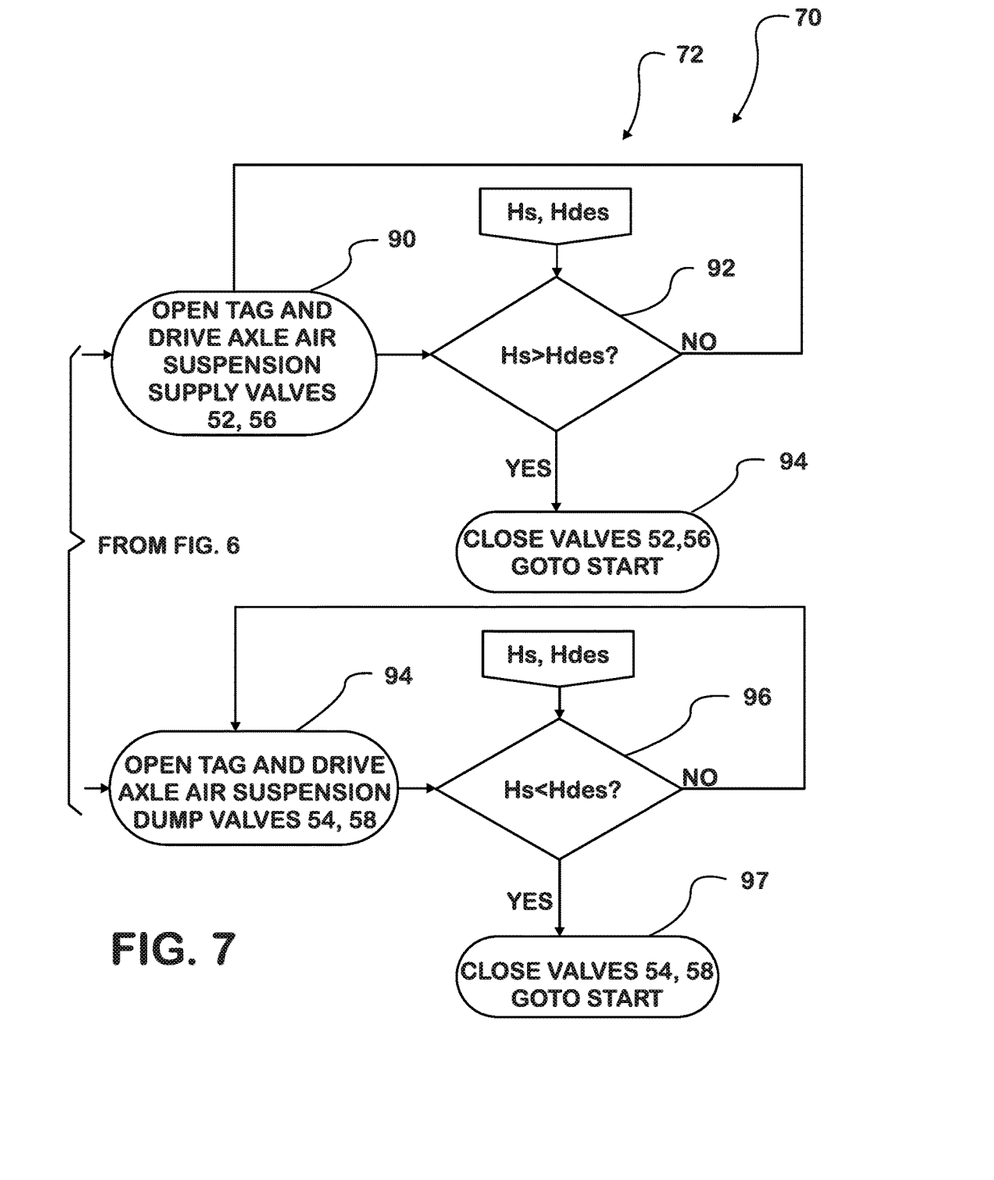
Figure 8:
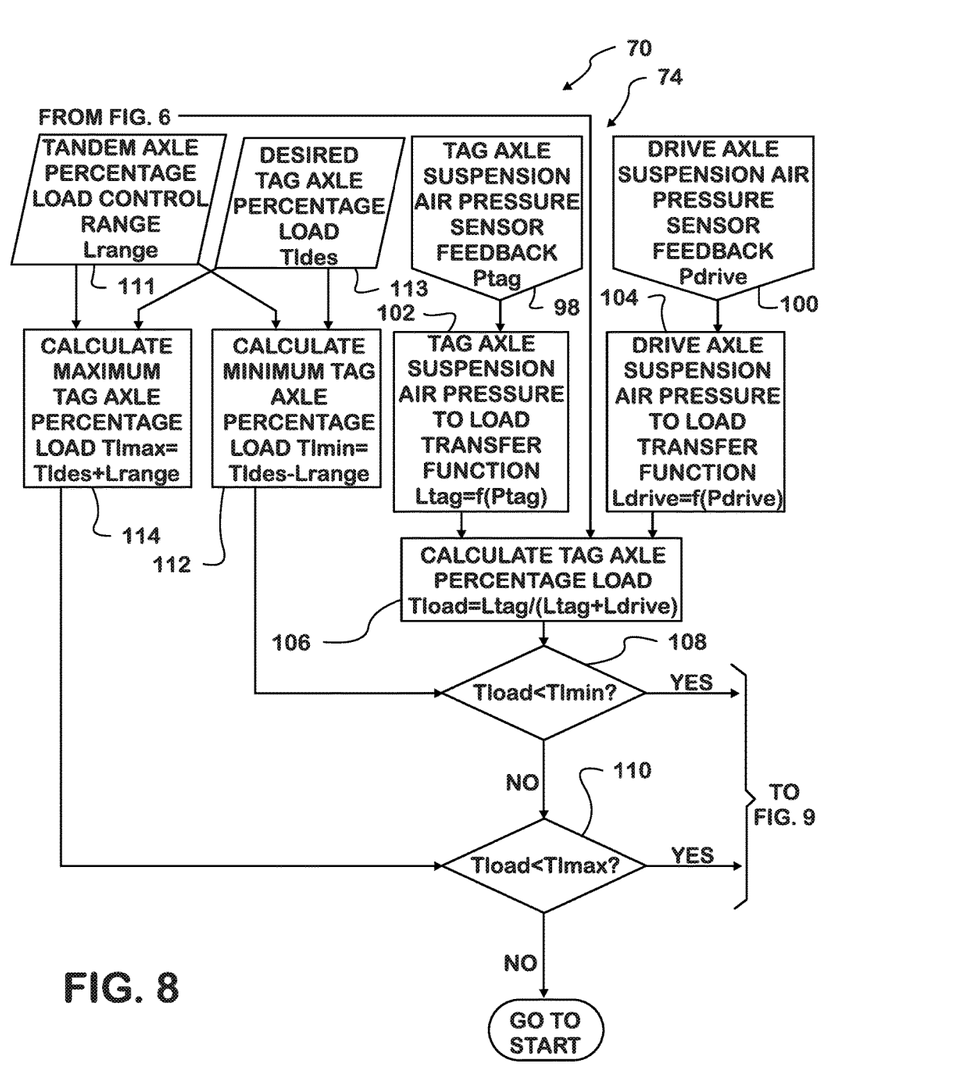
Figure 9:
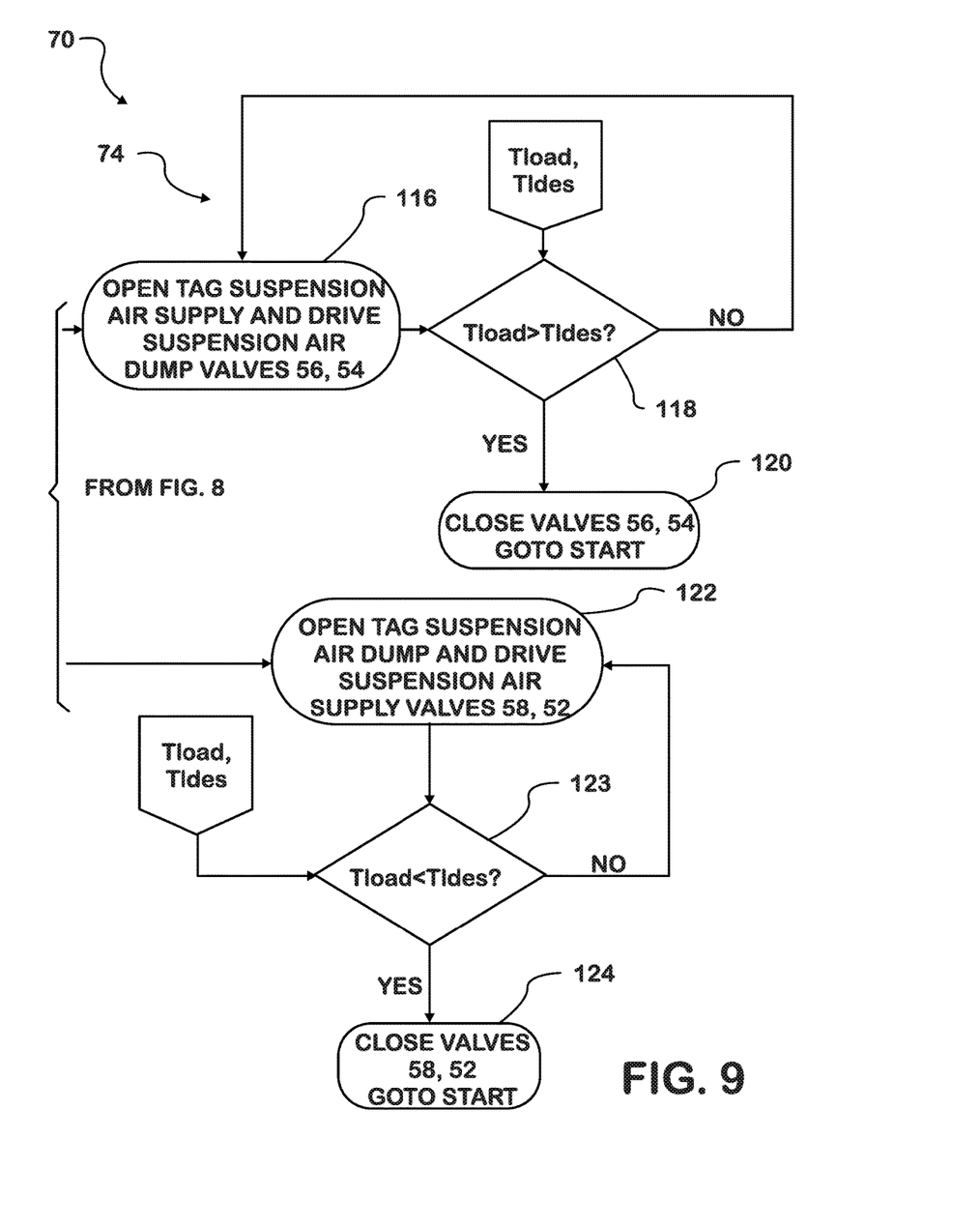

A first portion of control strategy 70 is a Ride Height Control Section 72 shown in FIGS. 6 and 7, and a second portion is an Axle Tandem Load Bearing Section 74 shown in FIGS. 8 and 9. The strategy is embodied as an algorithm which is repeatedly iterated in ECM 68 sufficiently frequently to control mechanism 42 on a timely basis in response to changing inputs.

Ride Height Control Section 72 compares a measure of suspension ride height (Hs) 82 provided by the signal output of ride height sensor 66 with each of a minimum suspension ride height (Hmin) and a maximum suspension ride height (Hmax).

The start of the algorithm begins with a step 76 which calculates minimum suspension ride height (Hmin) by subtracting a suspension ride height control range (Hrange) 78 from a desired suspension ride height (Hdes) 80. A step 84 determines if the measure of suspension ride height (Hs) 82 is, or is not, less than minimum suspension ride height (Hmin).

When step 84 discloses that the measure of suspension ride height (Hs) 82 is not less than minimum suspension ride height (Hmin), a step 86 calculates maximum suspension ride height (Hmax) by summing desired suspension ride height (Hdes) 80 and suspension ride height control range (Hrange) 78.

When step 84 discloses that the measure of suspension ride height (Hs) 82 is less than minimum suspension ride height (Hmin), then ECM 68 causes both supply valves 52 and 56 to open (step 90 in FIG. 7) and cause pressurized air from tank 60 to be introduced into all gas bags 44, 46, 48, 50. The result of opening both valves 52, 56 is to begin to increase suspension ride height and to begin comparing the measure of suspension ride height (Hs) 82 with desired suspension ride height (Hdes) 80 by a step 92. Step 92 determines if suspension ride height (Hs) 82 is, or is not, greater than desired suspension ride height (Hdes) 80.

As long as execution of step 92 discloses that the measure of suspension ride height (Hs) 82 is not greater than desired suspension ride height (Hdes), ECM 68 continues to keep both supply valves 52 and 56 open (step 90) and cause pressurized air from tank 60 to continue to be introduced into all gas bags 44, 46, 48, 50.

Only after step 92 has disclosed that the measure of suspension ride height (Hs) 82 has become greater than desired suspension ride height (Hdes) 80, does the algorithm cause valves 52, 56 (step 94) to close and then reiterate at step 76. Because of air which has been added to gas bags 44, 46, 48, 50, step 84 would be expected to disclose that the measure of suspension ride height (Hs) 82 has ceased being less than minimum suspension ride height (Hmin), and as a consequence, step 86 would be executed.

After step 86 has calculated maximum suspension ride height (Hmax) as explained above, a step 88 determines if the measure of suspension ride height (Hs) 82 is, or is not, greater than maximum suspension ride height (Hmax). If step 88 discloses that the measure of suspension ride height (Hs) 82 is not greater than maximum suspension ride height (Hmax), then the portion of strategy 70 in Axle Tandem Load Bearing Section 74 is executed (FIG. 8).

When step 88 discloses that the measure of suspension ride height (Hs) 82 is greater than maximum suspension ride height (Hmax), ECM 68 causes both dump valves 54 and 58 to open (step 94 FIG. 7) and consequently cause some pressurized air from all gas bags to be dumped, i.e. vented to atmosphere. The result of opening both dump valves 54, 58 is to begin to decrease suspension ride height and to begin to compare the measure of suspension ride height (Hs) 82 with desired suspension ride height (Hdes) 80 by a step 96. Step 96 determines if suspension ride height (Hs) 82 is, or is not, less than desired suspension ride height (Hdes) 80.

As long as execution of step 96 discloses that the measure of suspension ride height (Hs) 82 is not less than desired suspension ride height (Hdes), ECM 68 continues to keep both dump valves 54 and 58 open (step 94) and cause pressurized air to continue being dumped from all gas bags.

When execution of step 96 discloses that sufficient air has been dumped from all gas bags to cause the measure of suspension ride height (Hs) 82 to become less than desired suspension ride height (Hdes), then dump valves 54, 58 are closed (step 97) and the algorithm reiterates at step 76.

The foregoing description explains how Ride Height Control Section 72 performs closed-loop control of suspension ride height to keep suspension ride height within a desired suspension ride height range which is bounded by a maximum limit and a minimum limit. Values for Hdes and Hrange are selectable.

Axle Tandem Load Biasing Section 74 compares the percentage of the tandem axle load borne by tag axle 24 (Tload) with each of a minimum limit for tag axle percentage load (Tlmin) and a maximum limit for tag axle percentage load (Tlmax), both of which are functions of a desired tag axle percentage load (Tldes), and then uses results of those comparisons to perform closed-loop control of the percentage of the tandem axle load borne by tag axle 24 (Tload) to keep that percentage load within a tag axle percentage load range which is bounded by the maximum limit for tag axle percentage load (Tlmax) and the minimum limit for tag axle percentage load (Tlmin). Values for Tldes, Tlmax, and Tlmin are selectable.

Execution of Axle Tandem Load Biasing Section 74 of the algorithm begins with a step 106 (FIG. 8) which calculates percentage of the tandem axle load borne by tag axle 24 (Tload). The calculation is a function of gas pressure in the tag axle's gas bags 48, 50, as measured by the signal output (Ptag) 98 of pressure sensor 64, and of gas pressure in gas bags 44, 46 of drive axle 22, as measured by the signal output (Pdrive) 100 of pressure sensor 62.

A pressure-to-load transfer function (f(Ptag)) for tag axle 24 and a pressure-to-load transfer function (f(Pdrive)) for drive axle 22 are embodied in the algorithm. From the pressure measurement (Ptag) 98 provided by pressure sensor 64, a step 102 calculates the load borne by tag axle 24 (Ltag). From the pressure measurement (Pdrive) 100 provided by pressure sensor 62, a step 104 calculates the load borne by drive axle 22 (Ldrive). From those two load calculations, a step 106 calculates the percentage of the total load borne by both axles 22, 24 which is being borne by tag axle 24 (Tload).

A step 108 then compares the percentage of the total tandem axle load borne by tag axle 24 (Tload) with the minimum limit for tag axle percentage load (Tlmin). If the percentage of the total tandem axle load borne by tag axle 24 (Tload) is not less than the minimum limit for tag axle percentage load (Tlmin), then a step 110 compares the percentage of the total tandem axle load borne by tag axle 24 (Tload) with the maximum limit for tag axle percentage load (Tlmax). If the percentage of the total tandem axle load borne by tag axle 24 (Tload) is not greater than the maximum limit for tag axle percentage load (Tlmax), gas pressure in the gas bags requires no change. The algorithm then reiterates at step 76.

The minimum limit for tag axle percentage load (Tlmin) and the maximum limit for tag axle percentage load (Tlmax) define a tandem axle percentage load control range (Lrange) 111. The minimum limit for tag axle percentage load (Tlmin) is calculated by a step 112 which subtracts the tandem axle percentage load control range (Lrange) 111 from the desired tag axle percentage load (Tldes) 113. The maximum tag axle percentage load (Tlmax) is calculated by a step 114 which sums desired tag axle percentage load (Tldes) 113 and tandem axle percentage load control range (Lrange) 111.

If the calculation by step 108 discloses that the percentage of the total tandem axle load borne by tag axle 24 (Tload) is less than the minimum limit for tag axle percentage load (Tlmin), ECM 68 causes supply valve 56 and dump valve 54 to open (step 116, FIG. 9) and to begin comparing the percentage of the total tandem axle load borne by tag axle 24 (Tload) with desired tag axle percentage load (Tldes) 113 by a step 118.

Step 118 determines if the percentage of the total tandem axle load borne by tag axle 24 (Tload) is, or is not, greater than desired tag axle percentage load (Tldes) 113. The result of opening valves 54, 56 is to begin to increase the load borne by tag axle 24 and decrease the load borne by drive axle 22.

As long as execution of step 118 continues to disclose that the percentage of the total tandem axle load borne by tag axle 24 (Tload) is not greater than the desired tag axle percentage load (Tldes), ECM 68 keeps both control valves 56 and 54 open (step 116).

Only after execution of step 118 has disclosed that sufficient additional load has been apportioned to tag axle 24 to make the percentage of the total tandem axle percentage load borne by tag axle 24 (Tload) greater than the desired tag axle load percentage (Tldes) does the algorithm cause control valves 56 and 54 to close (step 120) and then reiterate at step 76.

Assuming that suspension ride height has not become less than minimum suspension ride height (Hmin) nor greater than maximum suspension ride height (Hmax), then step 108 (FIG. 8) is executed. Because of air which has been added to gas bags 48 and 50, and air which has been dumped from gas bags 44 and 46, step 108 would be expected to disclose that the percentage of the total tandem axle percentage load borne by tag axle 24 (Tload) has ceased being less than the minimum limit for tag axle percentage load (Tlmin), and as a consequence, step 110 would be executed. However, had suspension ride height become less than minimum suspension ride height (Hmin) or greater than maximum suspension ride height (Hmax), then the algorithm of Ride Height Control System 72 would first be executed to restore suspension ride height to within the desired suspension ride height range. Then after step 108 has disclosed that the percentage of the total tandem axle percentage load borne by tag axle 24 (Tload) has ceased being less than the minimum limit for tag axle percentage load (Tlmin), step 110 is executed.

When step 110 discloses that the percentage of the total tandem axle load borne by tag axle 24 (Tload) is greater than the maximum tag axle percentage load (Tlmax), ECM 68 causes both control valves 52 and 58 to open (step 122, FIG. 9). The result of opening valves 52 and 58 is to begin to increase the load borne by drive axle 22 and decrease the load borne by tag axle 24.

As long as execution of a step 123 continues to disclose that the percentage of the total tandem axle load borne by tag axle 24 (Tload) is not less than the desired tag axle percentage load (Tldes), ECM 68 keeps both control valves 52 and 58 open (step 122).

Only when a reiteration of step 123 discloses that sufficient load has been transferred from drive axle 22 to tag axle 24 to cause the percentage of the total tandem axle load borne by tag axle 24 (Tload) to become less than the desired tag axle load percentage (Tldes) does the algorithm cause control valves 52 and 58 to close (step 124) and then reiterate at step 76.

The foregoing description explains how Axle Tandem Load Biasing Section 74 performs closed-loop control of percentage of the total load on tandem axle 18 borne by tag axle 24 to keep that percentage within a range of a desired percentage load which is bounded by a maximum limit and a minimum limit.

Different values can be set for desired tag axle load percentage (Tldes) 113 to set different apportionments of the total tandem axle load to axles 22, 24. Such weight transfer events which transfer some of the load on one axle to the other axle can be controlled on-board truck vehicle 10 by a driver and or remotely via wireless communication. A variable parameter related to vehicle operation can set a value for desired tag axle load percentage (Tldes) 113. Such parameters include travelling speed of truck vehicle, its geographic location, and on-road and off-road surface conditions. Examples are presented in FIGS. 2, 3, and 4.

Figure 2:
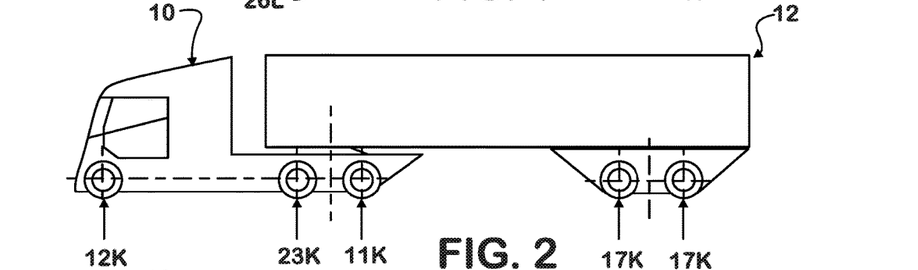
FIG. 2 is a view like FIG. 1 showing a first example of allocation of weight borne by axles of the truck vehicle and the trailer.

If maximum traction is needed when truck vehicle 10 is accelerated from zero travelling speed, desired tag axle load percentage (Tldes) 113 is set to a value which will apportion tandem axle load maximally to drive axle 22. This is shown in FIG. 2. If a drive axle has a locking/unlocking differential, it may be locked.

Figure 3:
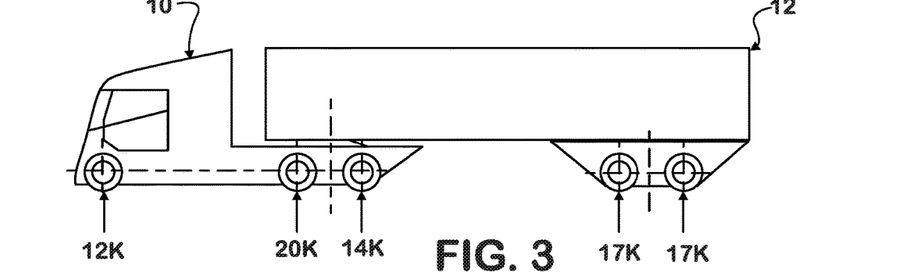
FIG. 3 is a view like FIG. 1 showing a second example of allocation of weight borne by axles of the truck vehicle and the trailer.

As truck vehicle 10 continues to accelerate and less traction is needed, desired tag axle load percentage (Tldes) 113 is set to a value which will transfer some of the load from drive axle 22 to tag axle 24. This is shown in FIG. 3. If a drive axle has a locking/unlocking differential which has been locked, it may be unlocked.

Once truck vehicle 10 accelerated to a steady travelling speed, desired tag axle load percentage (Tldes) 113 is set to a value which will transfer more of the load from drive axle 22 to tag axle 24 to apportion tandem axle load maximally to tag axle 24. This is shown in FIG. 4.

Figure 4:
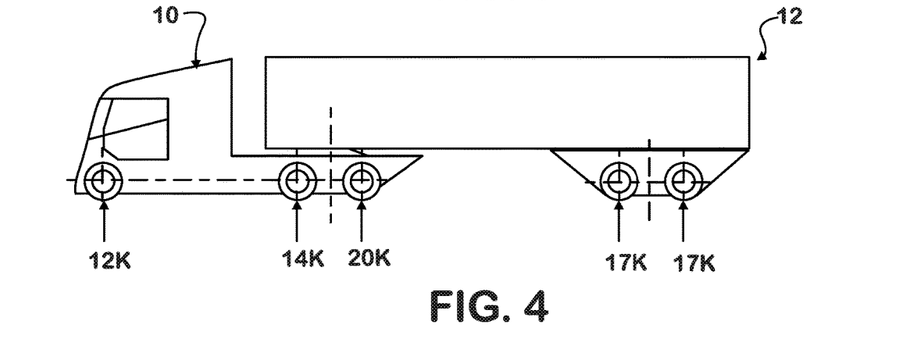
FIG. 4 is a view like FIG. 1 showing a third example of allocation of weight borne by axles of the truck vehicle and the trailer.

In the examples of FIGS. 2, 3, and 4, vehicle travelling speed controls load apportionment. The apportionment shown in FIG. 2 is applied when vehicle speed is within a range of 0 miles per hour (mph) up to 10 mph. The apportionment shown in FIG. 3 is applied when vehicle speed is greater than 10 mph up to 50 mph. The apportionment shown in FIG. 4 is applied when vehicle speed is greater than 50 mph.

Tires on the drive axle are different from those on the tag axle because only the drive axle is providing propulsion force. The drive axle tires are constructed to deliver propulsion force on an underlying surface and are therefore stiffer than tag axle tires. Because the tag axle is non-driven, its tires can be less stiff, and consequently have a lower rolling resistance coefficient than the drive axle's tires, enabling fuel economy to be improved at higher travelling speeds by allocating more of the total tandem axle load to the tag axle.

Figure 10:
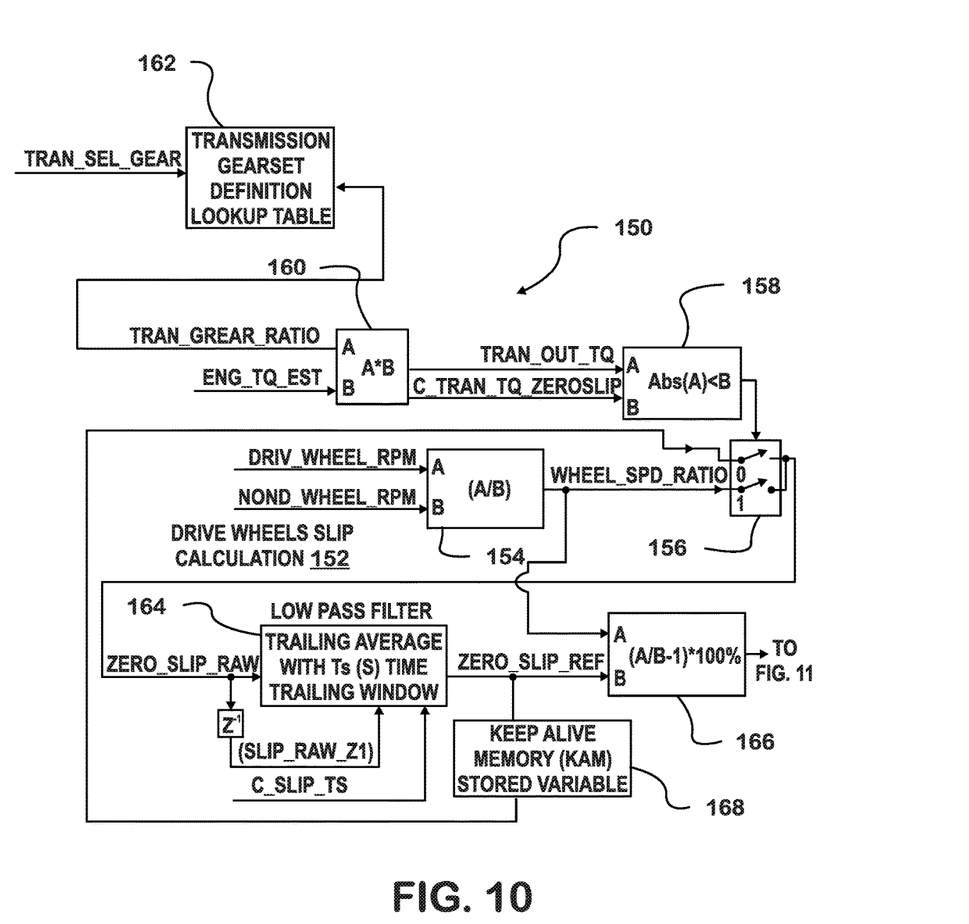
FIGS. 10 and 11 show a high level strategy diagram for setting desired drive axle load as a percentage of weight borne by fore and aft axles of the tandem axle.
Figure 11:
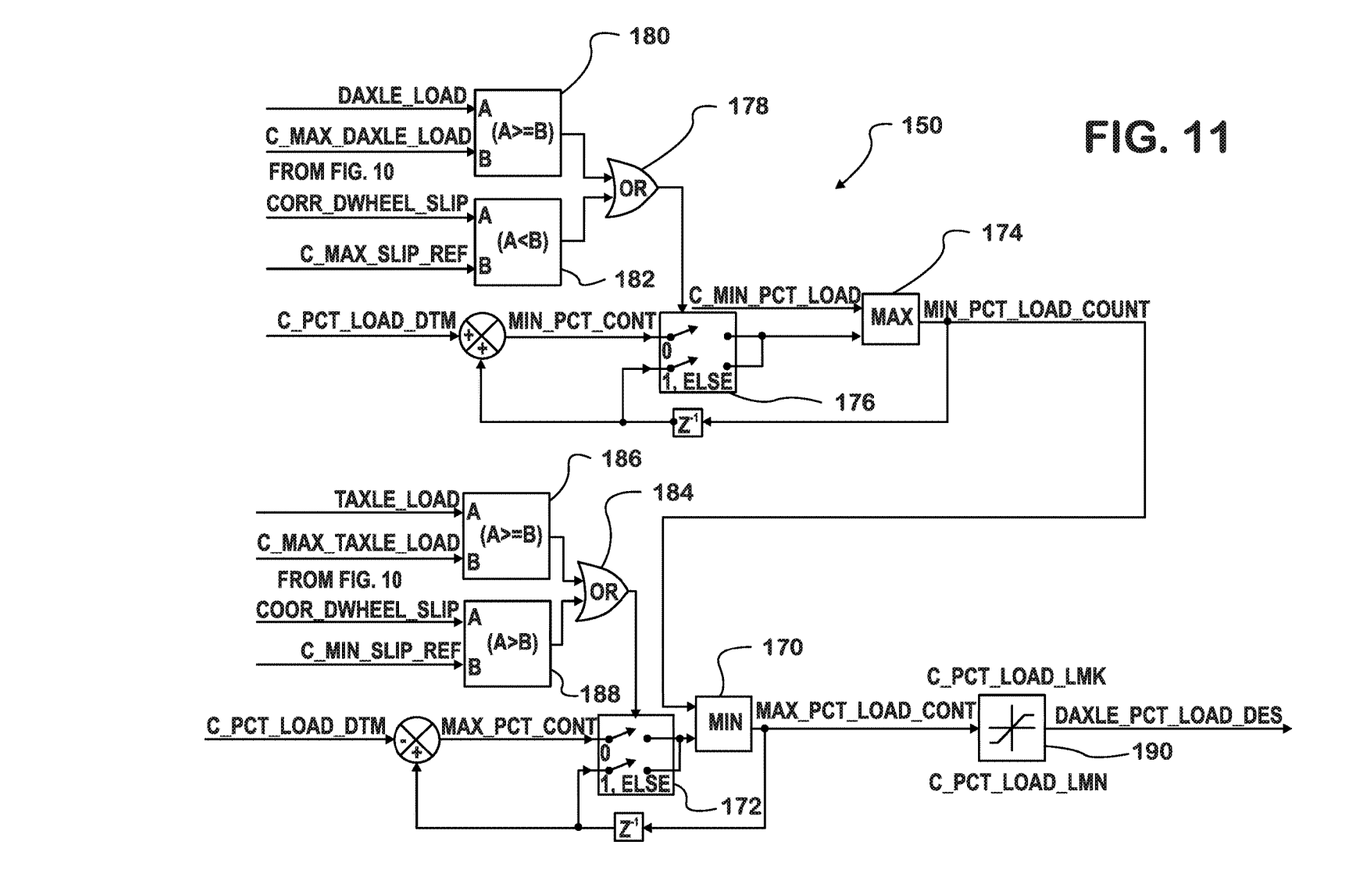

FIGS. 10 and 11 disclose a strategy 150 for setting desired drive axle load percentage. Setting desired drive axle load percentage inherently sets desired tag axle load percentage (Tldes) 113 because the two percentages must always add to 100%. A parameter DAXLE_PCT_LOAD_DES (FIG. 11) represents desired drive axle load percentage.

The condition of an underlying surface on which truck vehicle 10 and trailer 12 are traveling and the magnitude of torque which is being delivered by powertrain 69 to drive axle 22 are variables which can affect slip of any of the wheels of either truck vehicle 10 or trailer 12. Slip of right dual wheels 26R and slip of left dual wheels 26L of drive axle 22 relative to slip of a non-driven wheel or an average slip of non-driven wheels of truck vehicle 10 is calculated in a drive wheels slip calculation section 152 of strategy 150.

A division function 154 repeatedly divides rotational velocity of each, or just one, of dual wheels 26R, 26L, or an average of their rotational velocities (parameter DRIV_WHEEL_RPM) by rotational velocity of a non-driven wheel or an average of rotational velocities of multiple non-driven wheels such as right and left front wheels 16 (parameter NOND_WHEEL_RPM). Rotational velocity of any wheel is provided by a sensor such as an ABS wheel speed sensor. Any significant differences between diameters of tires on wheels which are selected for use in the calculation may be taken into account.

The result of each calculation is represented by a parameter WHEEL_SPD_RATIO which is an input to a switch function 156. If either of the dual wheels of drive axle 22 begins to slip relative to a non-drive wheel, parameter WHEEL_SPD_RATIO will begin to increase in magnitude.

The condition of switch function 156 is controlled by two parameters TRAN_OUT_TQ and C_TRAN_TQ_ZEROSLIP. Parameter TRAN_OUT_TQ represents the torque input to drive axle 22 from powertrain 69. C_TRAN_TQ_ZEROSLIP is a settable parameter which is used by a function 168 to allow parameter WHEEL_SPD_RATIO to be further processed by strategy 150 provided that torque being delivered to drive axle 22 does not exceed the value of parameter C_TRAN_TQ_ZEROSLIP. Parameter TRAN_OUT_TQ is calculated by a multiplication function 160 which multiplies estimated torque being produced by an engine in powertrain 69 (parameter ENG_TQ_EST) by a gear ratio (parameter TRAN_GREAR_RATIO) in which a transmission in powertrain 69 has been placed by a gear selection function 162 to which is input a parameter TRAN_SEL_GEAR representing a particular transmission gear.

When torque being delivered to drive axle 22 does not exceed the limit imposed by parameter C_TRAN_TQ_ZEROSLIP, parameter WHEEL_SPD_RATIO is processed as a parameter (ZERO_SLIP_RAW) by a function 164 which acts as a low pass filter which averages the wheel speed ratio over a selected interval of time which extends backward from present time.

Function 164 outputs a parameter ZERO_SLIP_REF which is one of two inputs to a function 166. Parameter WHEEL_SPD_RATIO is the other input to function 166. Function 166 divides the value of parameter WHEEL_SPD_RATIO by the value of parameter ZERO_SLIP_REF and subtracts unity from the quotient to create a percentage (parameter CORR_DWHEEL_SLIP—in FIG. 11) whose value represents percentage slip of a drive axle's wheel or wheels as explained above.

A "keep alive memory" 168 stores the value of parameter ZERO_SLIP_REF for use as the value for parameter ZERO_SLIP_RAW when function 158 detects that transmission output torque (parameter TRAN_OUT_TQ) has become less than the selected torque limit (parameter C_TRAN_TQ_ZEROSLIP).

The drive axle wheel slip percentage represented by the value of parameter CORR_DWHEEL_SLIP controls the value of a parameter MAX_PCT_LOAD_CONT (FIG. 11) which in turn controls the desired percentage load borne by drive axle 22 (parameter DAXLE_PCT_LOAD_DES). The value of parameter MAX_PCT_LOAD_CONT sets an upper limit of a drive axle percentage load range for drive axle 22 and is controlled by two inputs to a minimum selection function MIN 170. Those two inputs are the output of a switch 172 and the output of a maximum selection function MAX 174 (parameter MIN_PCT_LOAD_CONT).

One input to maximum selection function 174 is a parameter C_MIN_PCT_LOAD and the other input is the output of a switch 176. The value of parameter C_MIN_PCT_LOAD sets a lower limit for the drive axle percentage load range for drive axle 22. Strategy 150 functions to control the percentage load borne by drive axle 22 to be no lower than the lower limit of the drive axle percentage load range C_MIN_PCT_LOAD and no greater than the upper limit of the drive axle percentage load range MAX_PCT_LOAD_CONT. Because the sum of the percentage loads on drive axle 22 and tag axle 24 totals 100%, the percentage load borne by tag axle 24 is inherently also controlled to be no greater than a maximum tag axle percentage load and no less than a minimum tag axle percentage load.

Strategy 150 functions to apportion a percentage load to each of the two axles 22, 24 within identical ranges between a minimum percentage load and a maximum percentage load with the sum of the apportioned percentages always equaling 100%.

Switch 176 is controlled by an OR logic function 178 to which outputs of a comparison function 180 and a comparison function 182 are inputs. Comparison function 180 compares a parameter DAXLE_LOAD whose value represents load borne by drive axle 22 and a parameter C_MAX_DAXLE_LOAD whose value represents an upper limit of a drive axle load control range for drive axle 22. Comparison function 182 compares the value of parameter CORR_DWHEEL_SLIP and a parameter C_MAX_SLIP_REF whose value represents an upper limit of a drive axle wheel slip control range.

When drive axle load (DAXLE_LOAD) is equal to or greater than the upper limit of the drive axle load control range (C_MAX_DAXLE_LOAD) or drive axle wheel slip (CORR_DWHEEL_SLIP) is less than the upper limit of the drive axle wheel slip control range (C_MAX_SLIP_REF), then switch 176 does not change the value of parameter MIN_PCT_LOAD_CONT.

When drive axle load (DAXLE_LOAD) is less than the upper limit of the drive axle load control range (C_MAX_DAXLE_LOAD) and drive axle wheel slip (CORR_DWHEEL_SLIP) is equal to or greater than the upper limit of the drive axle wheel slip control range (C_MAX_SLIP_REF), then switch 176 causes parameter MIN_PCT_LOAD_CONT to be incremented in increments which are set by the value of a parameter C_PCT_LOAD_DTM. Minimum selection function 170 causes the incremented value of parameter MIN_PCT_LOAD_CONT to become the new value for parameter MAX_PCT_LOAD_CONT. The result is to begin increasing the percentage load borne by drive axle 22 as is permitted by function 180, and concurrently decreasing the percentage load borne by tag axle 24. Increasing the percentage load borne by drive axle 22 increases traction of its drive wheels with an underlying road surface and consequently decreases drive axle wheel slip. When drive axle wheel slip has been brought back into drive axle wheel slip control range, function 182 causes the incremental increases in parameters MIN_PCT_LOAD_CONT and MAX_PCT_LOAD_CONT to cease.

Switch 172 is controlled by an OR logic function 184 to which outputs of a comparison function 186 and a comparison function 188 are inputs. Comparison function 186 compares a parameter TAXLE_LOAD whose value represents load borne by tag axle 24 and a parameter C_MAX_TAXLE_LOAD representing an upper limit of a tag axle load control range for tag axle 24. Comparison function 188 compares drive axle wheel slip (CORR_DWHEEL_SLIP) and a parameter C_MIN_SLIP_REF whose value represents a lower limit of the drive axle wheel slip control range.

When load borne by tag axle 24 (TAXLE_LOAD) is equal to or greater than the upper limit of the tag axle load control range (C_MAX_TAXLE_LOAD) or drive axle wheel slip (CORR_DWHEEL_SLIP) is greater than the lower limit of the drive axle wheel slip control range (C_MIN_SLIP_REF), then switch 172 does not change the value of parameter MAX_PCT_LOAD_CONT.

When load borne by tag axle 24 (TAXLE_LOAD) is less than the upper limit of the tag axle load control range (C_MAX_TAXLE_LOAD) and drive axle wheel slip (CORR_DWHEEL_SLIP) is equal to or less than the lower limit for the drive wheel slip control range (C_MIN_SLIP_REF), then switch 172 causes parameter MAX_PCT_LOAD_CONT to be decremented in decrements which are set by the value of parameter C_PCT_LOAD_DTM. The result is to begin increasing the percentage load borne by tag axle 24 as permitted by function 186, and concurrently decreasing the percentage load borne by drive axle 22. Decreasing the percentage load borne by drive axle 22 decreases traction of its drive wheels with an underlying road surface and consequently increases drive axle wheel slip. When drive axle wheel slip has been brought back into drive axle wheel slip control range, function 188 causes the decrementing of parameter MAX_PCT_LOAD_CONT to cease. During decrementing of parameter MAX_PCT_LOAD_CONT, comparison function 182 prevents incrementing, and during incrementing of parameter MAX_PCT_LOAD_CONT, comparison function 188 prevents decrementing.

The following is an example of how strategy 150 operates. Assume that C_MAX_SLIP_REF is 2.0% and C_MIN_SLIP_REF is 1.0%. When drive axle wheel slip rises to and above 2.0% while load borne by drive axle 24 is below the upper limit of the drive axle load control range, load on tag axle 24 begins to be incrementally transferred to drive axle 22. When enough load has been transferred to bring drive axle wheel slip back to 2.0%, further load transfer stops. When drive axle wheel slip falls to and below 1.0% while load borne by tag axle 24 is below the upper limit of the tag axle load control range, load on drive axle 22 begins to be incrementally transferred to tag axle 24. When enough load has been transferred to bring drive axle wheel slip back to 1.0%, further transfer stops. In this way, strategy 150 controls the respective percentages apportioned to drive axle 22 and to tag axle 24 to maintain load borne by one of the two axles 22, 24 within an axle load control range and to maintain drive axle wheel slip within a drive axle wheel slip control range for at least one drive wheel of drive axle 22.

The foregoing description of FIGS. 10 and 11 discloses that desired drive axle load percentage DAXLE_PCT_LOAD_DES is a function multiple parameters. Values for drive axle load DAXLE_LOAD, tag axle load TAXLE_LOAD, and parameter CORR_DWHEEL_SLIP are developed from sensors as explained earlier. Parameters C_MAX_DAXLE_LOAD, C_MAX_SLIP_REF, C_MAX_TAXLE_LOAD, and C_MIN_SLIP_REF are selectable parameters which can be set for a particular truck vehicle based on factors such as load bearing capacity of an axle and axle load limits on public roadways. Wheel slip may be measured in terms of percentage or rotational speed differential.

A drive axle load percentage limitation function 190 is provided to impose global limits on DAXLE_PCT_LOAD_DES. On the high side, C_PCT_LOAD_LMX can represent, for example, a maximum percentage limit on drive axle load intended to avoid excessive instability. On the low side, C_PCT_LOAD_LMN, can represent a minimum % limit on drive axle load intended to avoid excessive loss of traction in certain situations and/or to prevent potential gas bag damage.

What is claimed is:

1. A truck vehicle comprising:
   a chassis comprising a chassis frame;
   a speed sensor for providing data indicative of the speed of the vehicle, at least as between a first predetermined speed, a second predetermined speed and a third predetermined speed;
   steerable right and left front wheels suspended from the chassis frame;
   a tandem axle suspended from the chassis frame rearward of the front wheels and comprising a drive axle having drive wheels and a tag axle having non-drive wheels;
   a load apportioning mechanism for apportioning the sum total of weight borne by the tandem axle between the drive axle and the tag axle; and
   a controller for receiving the data indicative of the speed of the vehicle from the speed sensor and controlling the load apportioning mechanism to apportion a desired percentage of the sum total of weight borne by the tandem axle as between the drive axle and tandem axle based at least in part on the speed of the vehicle as follows:
      when the data indicative of the speed of the vehicle indicates that the speed of the vehicle is less than the first predetermined speed (first speed range), the controller apportions a first predetermined maximum allowable load to the drive axle, with a lesser load on the tag axle;
      when the data indicative of the speed of the vehicle indicates that the speed of the vehicle is equal to or greater than the first predetermined speed, but less than the second predetermined speed (second speed range), the controller apportions a second predetermined load, which is less than the first predetermined load, to the drive axle, with a lesser load on the tag axle which is greater than the load on the tag axle in the first speed range; and
      when the data indicative of the speed of the vehicle indicates that the speed of the vehicle is equal to or greater than the second predetermined speed (third speed range), the controller apportions the second predetermined load to the tag axle, with a lesser load on the drive axle.

2. The truck vehicle as set forth in claim 1 in which the controller further receives signals indicative of the ride height of the vehicle, and the controller controls the mechanism to apportion a desired percentage of the sum total of weight as between the tandem axle and the tag axle simultaneous with maintaining the ride height of the vehicle within a predetermined ride height range regardless of the apportionment of weight between the drive axle and the tag axle.

3. The truck vehicle as set forth in claim 1 in which the second predetermined load is the maximum load allowed by for vehicles.

4. The truck vehicle as set forth in claim 1 in which both the ride height of the vehicle and the apportionment of load as between the drive axle and the tag axle are controlled by inflating and deflating gas bags.

5. The truck vehicle as set forth in claim 4 in which the gas bags comprise one or more gas bags disposed between the chassis frame and the load for apportionment of the load as between the drive axle and the tag axle and one or more gas bags disposed between the chassis frame and the drive axle for adjustment of the ride height of the vehicle.

6. The truck vehicle as set forth in claim 2 in which the truck vehicle further comprises a ride height sensor which sends a signal to the controller indicative of the height of the drive axle from the road on which the vehicle is travelling, which signal is processed by the controller to keep the height of the drive axle of the vehicle within the predetermined height range.

7. The truck vehicle as set forth in claim 1 further comprising a fifth wheel supported on the chassis frame in overlying relation to the tandem axle, and further including a trailer coupled to the fifth wheel for towing by the truck vehicle with weight of the trailer bearing on the fifth wheel contributing to the sum total of weight borne by the tandem axle.

8. The truck vehicle as set forth in claim 1 in which the drive axle is forward of the tag axle.

9. The truck vehicle as set forth in claim 1 in which the controller comprises a control strategy for actively controlling the mechanism during operation of the vehicle to apportion a percentage of the sum total of weight borne by the tandem axle relative to the drive axle to a percentage within a percentage range between a minimum percentage load and a maximum percentage load with the sum of the apportioned percentages always equaling 100%.

10. The truck vehicle as set forth in claim 2 in which the respective load percentages apportioned to the drive axle and to the tag axle by the controller are functions of load borne by the drive axle, load borne by the tag axle, and slip of at least one wheel of the drive axle.

11. The truck vehicle as set forth in claim 10 in which the controller operates the mechanism to control the respective percentages apportioned to the drive axle and to the tag axle as a function of a load control range for load borne by one of the axles of the tandem axle and as a function of a drive axle wheel slip control range for at least one wheel of the drive axle.

12. The truck vehicle as set forth in claim 11 in which the controller operates the mechanism to cause the percentage apportioned to the drive axle to increase and the percentage apportioned to the tag axle to decrease when load borne by the drive axle is less than an upper limit of a load control range for load borne by the drive axle and wheel slip is greater than an upper limit of the drive axle wheel slip control range and to cause the percentage apportioned to the drive axle to decrease and the percentage apportioned to the tag axle to increase when load borne by the tag axle is less than an upper limit of load control range for load borne by the tag axle and wheel slip is less than a lower limit of the drive axle wheel slip control range.

13. A method for controlling a load apportioning mechanism to apportion the sum total of weight borne by a tandem axle of a vehicle between a drive axle and a tag axle of the tandem axle, the vehicle comprising a chassis frame, steerable right and left front wheels suspended from the chassis frame, and a tandem axle suspended from the chassis frame rearward of the front wheels and comprising a drive axle having drive wheels and a tag axle having non-drive wheels, the method comprising, providing a controller for receiving data indicative of the speed of the vehicle from the speed sensor and controlling the load apportioning mechanism to apportion a desired percentage of the sum total of weight borne by the tandem axle as between the drive axle and tandem axle based at least in part on the speed of the vehicle as follows:

when the data indicative of the speed of the vehicle indicates that the speed of the vehicle is less than the first predetermined speed (first speed range), the controller apportions a first predetermined maximum allowable load to the drive axle, with a lesser load on the tag axle;

when the data indicative of the speed of the vehicle indicates that the speed of the vehicle is equal to or greater than the first predetermined speed, but less than the second predetermined speed (second speed range), the controller apportions a second predetermined load, which is less than the first predetermined load, to the drive axle, with a lesser load on the tag axle which is greater than the load on the tag axle in the first speed range; and when the data indicative of the speed of the vehicle indicates that the speed of the vehicle is equal to or greater than the second predetermined speed (third speed range), the controller apportions the second predetermined load to the tag axle, with a lesser load on the drive axle.

14. The method as set forth in claim 13 comprising, controlling the mechanism to cause the respective percentages apportioned to the drive axle and to the tag axle as functions of load borne by the drive axle, load borne by the tag axle, and slip of at least one drive wheel of the drive axle.

15. The method as set forth in claim 14 comprising, controlling the mechanism to cause the respective percentages apportioned to the drive axle and to the tag axle to be maintained within an axle load control range for one of the drive axle and the tag axle and to maintain drive axle wheel slip for at least one wheel of the drive axle within a drive axle wheel slip control range.

16. The method as set forth in claim 15 comprising, controlling the mechanism to cause the percentage apportioned to the drive axle to increase and the percentage apportioned to the tag axle to decrease when load borne by the drive axle is less than an upper limit of a drive axle load control range for load borne by the drive axle and wheel slip is greater than an upper limit of the drive axle wheel slip control range and to cause the percentage apportioned to the drive axle to decrease and the percentage apportioned to the tag axle to increase when load borne by the tag axle is less than an upper limit of a tag axle load control range for load borne by the tag axle and wheel slip is less than a lower limit of the drive axle wheel slip control range.

* * * * *

UNITED STATES PATENT AND TRADEMARK OFFICE
CERTIFICATE OF CORRECTION

| | |
|---|---|
| PATENT NO. | : 10,046,814 B2 |
| APPLICATION NO. | : 15/042910 |
| DATED | : August 14, 2018 |
| INVENTOR(S) | : Siuchta et al. |

Page 1 of 1

It is certified that error appears in the above-identified patent and that said Letters Patent is hereby corrected as shown below:

In the Specification

On Column 1, Line 21, before the "BACKGROUND", please insert the following paragraph:
-- STATEMENT REGARDING FEDERALLY SPONSORED RESEARCH OR DEVELOPMENT
This invention was made with government support under DE-EE0003303 awarded by the U.S. Department of Energy. The Government therefore has certain rights in the invention. --

Signed and Sealed this
Twenty-seventh Day of February, 2024

*Katherine Kelly Vidal*

Katherine Kelly Vidal
*Director of the United States Patent and Trademark Office*